US012208049B2

(12) United States Patent
Wu

(10) Patent No.: US 12,208,049 B2
(45) Date of Patent: Jan. 28, 2025

(54) HANDHELD ROLLER

(71) Applicant: Jiaming Wu, Meizhou (CN)

(72) Inventor: Jiaming Wu, Meizhou (CN)

( * ) Notice: Subject to any disclaimer, the term of this patent is extended or adjusted under 35 U.S.C. 154(b) by 0 days.

(21) Appl. No.: 18/765,222

(22) Filed: Jul. 6, 2024

(65) Prior Publication Data

US 2024/0358585 A1 Oct. 31, 2024

(51) Int. Cl.
*A61H 15/00* (2006.01)

(52) U.S. Cl.
CPC . *A61H 15/0092* (2013.01); *A61H 2015/0021* (2013.01); *A61H 2201/1253* (2013.01); *A61H 2201/14* (2013.01)

(58) Field of Classification Search
CPC ................ A61H 15/00; A61H 15/0092; A61H 2015/0007; A61H 2015/0014; A61H 2015/0021; A61H 2015/0028; A61H 2015/0035; A61H 2201/1253; A61H 2201/14
See application file for complete search history.

(56) References Cited

U.S. PATENT DOCUMENTS 2,621,652 A * 12/1952 Ehrhardt ............ A61H 15/0092 601/119
3,970,078 A * 7/1976 Rogers, Jr. ......... A61H 15/0092 601/125
D385,319 S * 10/1997 Lucas .......................... D21/684
5,716,333 A * 2/1998 Larsen ............... A61H 33/6089 4/575.1
2013/0310234 A1* 11/2013 Miller, Jr. .............. A63B 22/20 482/139
2019/0038499 A1* 2/2019 Horowitz ............... A61H 15/00
2020/0390642 A1* 12/2020 Kim ..................... A61N 1/0456

FOREIGN PATENT DOCUMENTS

KR 2017100862 A * 9/2017 ......... A61H 15/0092

* cited by examiner

*Primary Examiner* — Colin W Stuart
*Assistant Examiner* — Douglas Y Sul

(57) ABSTRACT

The present application relates to the technical field of decompression toys. A handheld roller includes a holding frame. The holding frame includes two axis bodies and a holder for a rotating connection of the axis bodies, and side walls of the two axis bodies are rotationally connected with interiors of at least two drums. A top face and a bottom face of the holder are holder end faces, both sides of the top face and the bottom face of the holder are separately provided with installation holes, the holder end faces located at the positions of the installation holes are separately provided with convex holes, hole diameters of the convex holes are consistent with those of the installation holes, top faces of the convex holes are convex hole end faces, and the convex hole end faces are higher than the holder end faces.

12 Claims, 9 Drawing Sheets

HANDHELD ROLLER

TECHNICAL FIELD

The present application relates to the technical field of decompression toys, and in particular, to a handheld roller.

BACKGROUND OF THE INVENTION

Due to faster and faster pace of life in the modern society, people are often under various stress; and the stress is a negative feeling involuntarily generated when people are affected by environments, frequently causing people's emotional fluctuation, thus generating negative emotions such as depression, anger and anxiety. Excessive and too much stress will affect physical and psychological health. Therefore, people often try various ways to relief stress when they have psychological stress, to adjust the mood and mental state, and playing various decompression toys is a choice.

Most of the existing decompression toys relief people's stress by squeezing and other ways, are relatively simple and not interesting, such as a handheld roller; when the handheld roller turns or rotates, these units may rotate to occupy, entertain and comfort users, but the existing handheld roller still exists the problem that the rotation is not stable enough, and moreover the existing handheld roller is not stable enough and great in fluctuation during use, causing that the roller is not smooth enough during rotation, and more difficult to use.

Hence, when turning or rotating, the handheld roller will bring a poor experience to the users.

Therefore, the structure of the existing handheld roller needs to be further improved.

SUMMARY OF THE INVENTION

In view of the foregoing problem existing the prior art, the problem to be solved by the present application is to provide a handheld roller, to solve the problem that the existing handheld roller still has an unstable rotation.

The technical solution adopted by the present disclosure to solve the technical problem is as follows.

A handheld roller, includes a holding frame, wherein at least four drums rotate on a side wall of the holding frame, the holding frame includes two axis bodies and a holder for a rotating connection of the axis bodies, and side walls of the two axis bodies are rotationally connected with interiors of at least two drums;

a top face and a bottom face of the holder are holder end faces, both sides of the top face and the bottom face of the holder are separately provided with installation holes, the holder end faces located at the positions of the installation holes are separately provided with convex holes, hole diameters of the convex holes are consistent with those of the installation holes, top faces of the convex holes are convex hole end faces, and the convex hole end faces are higher than the holder end faces; and first bearings are arranged inside the convex holes, the two axis bodies are inserted into inner rings of the first bearings in respective, and the two axis bodies rotate in the convex holes on both sides of the holder through the first bearings, respectively.

Preferably, both the axis bodies include axis levers and fixed columns arranged on both ends of the axis levers, end faces of the fixed columns are provided with fixed holes, and side walls of the axis levers are rotationally connected with the interiors of the drums.

Preferably, the two axis bodies are separately provided with pin heads at outer end parts of the drums, the pin heads include pin columns, the pin columns are mounted in the fixed holes that are provided on the end faces of the fixed columns, end parts of the pin columns are provided with bosses, and end parts of the bosses are provided with pin caps.

Preferably, axis holes are provided inside the at least four drums, two end faces of the four drums are provided with first built-in slots and second built-in slots, bearing installation holes are provided in the drums located between the first built-in slots and the axis holes, and the first built-in slots, the bearing installation holes, the axis holes and the second built-in slots have axes located on a same axis.

Preferably, the fixed columns are located in the bearing installation holes and the first built-in slots, the axis levers are located in the axis holes, and side walls of the axis levers are rotationally connected in the installation holes and the convex holes that are provided on both sides of the holder through the first bearings, wherein second bearings are provided at gaps between peripheries of the fixed columns and the bearing installation holes.

Preferably, inner diameters of the first built-in slots are greater than diameters of the pin caps of the pin heads, and an edge of one face of each of the pin caps that is close to each of the first built-in slots presents an arc surface.

Preferably, inner diameters of the second built-in slots are greater than outer diameters of the convex holes, and the convex hole end faces are arranged inside the second built-in slots.

Preferably, a transition surface from a side wall of any one of the at least four drums to the two end faces thereof is an arc surface, and a transition edge from the two end faces of any one of the drums to each of the first built-in slots and each of the second built-in slots is an arc edge.

Preferably, diameters of the fixed columns are less than those of the axis levers.

Preferably, a circle of the side wall of the holder and edges of the holder end faces are set as fillet structures, side walls of both sides of the holder are indented arc surfaces facing inwards, and both end parts of the holder are oblate structures.

The present application has the following beneficial effects:

The use of the thicker first bearings is allowed in a premise that the rest part of the holder is unchanged in thickness through a design that the existing holder is added with the convex holes and the convex holes are thicker than the holder, such that inserting columns of the axis bodies are inserted and fixed to the inner rings of the first bearings in a manner of more contact area, thus further increasing the rotating stability; and meanwhile a further improvement is made to the drums after adding the convex holes, a rotating friction will not be caused among the drums by providing the second built-in slots on one end face of each of the drums in a case of ensuring the drums to add the convex holes, and a rotating space is reserved for the added convex holes, thus ensuring the stability when the drums rotate on the holding frame.

Using the handheld roller by the user can help finger training and exercise, palms are more flexible and healthy, and this handheld roller can provide the more flexible and healthy decompression mode to the user.

In addition to the purpose, feature and advantage described above, the present application has other purposes, features and advantages. The present application is further described in detail below in combination with drawings.

BRIEF DESCRIPTION OF DRAWINGS

The drawings described herein are used to provide a further understanding of this application, and constitute a part of the present disclosure. The exemplary embodiments and descriptions of the present disclosure are used to explain the present disclosure and do not constitute an improper limitation of the present disclosure. In the drawings.

DETAILED DESCRIPTION OF THE INVENTION

It is to be noted that the embodiments in present disclosure and the features in the embodiments may be combined with one another without conflict. The present disclosure will now be described below in detail with reference to the drawings and the embodiments.

In order to make a person skilled in the art to better understand the solutions of the present disclosure, the technical solutions in the embodiments of the present disclosure are described below with reference to the accompanying drawings in the embodiments of the present disclosure the described embodiments are merely some rather than all of the embodiments of the present disclosure. The embodiments in the present disclosure shall all fall within the protection scope of the present disclosure.

Please refer to FIG. 1 to FIG. 9, the present disclosure provides the embodiments:

Embodiment 1

Figure 1:
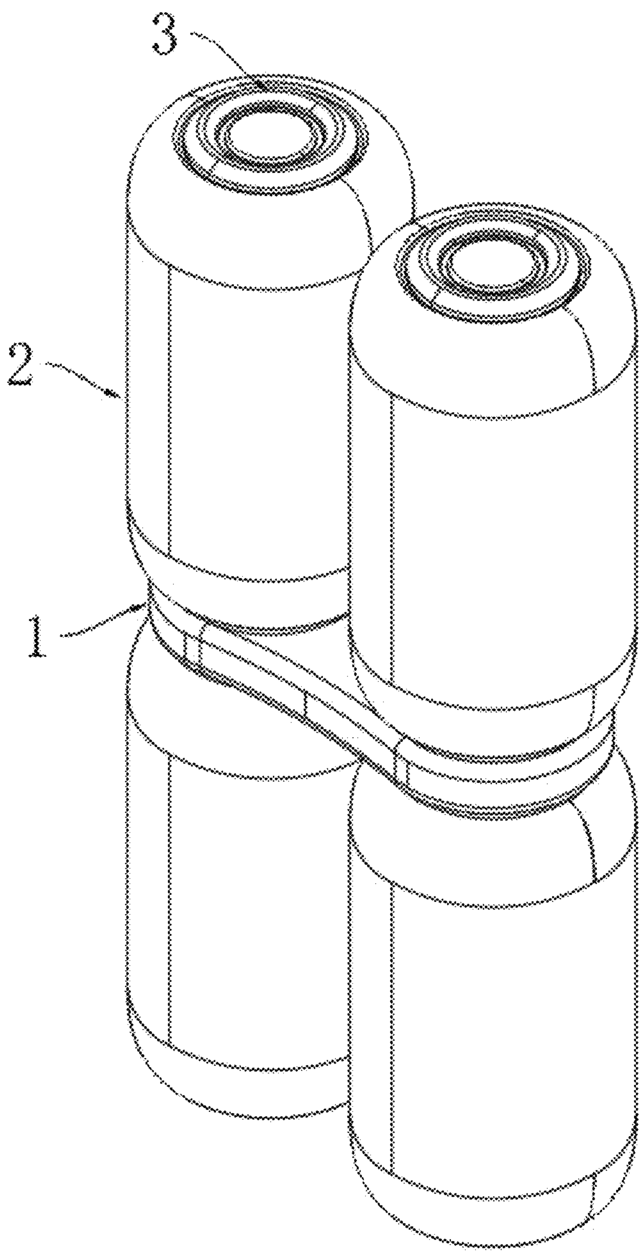
FIG. 1 is an overall schematic diagram of a handheld roller in the present application.
Figure 4:
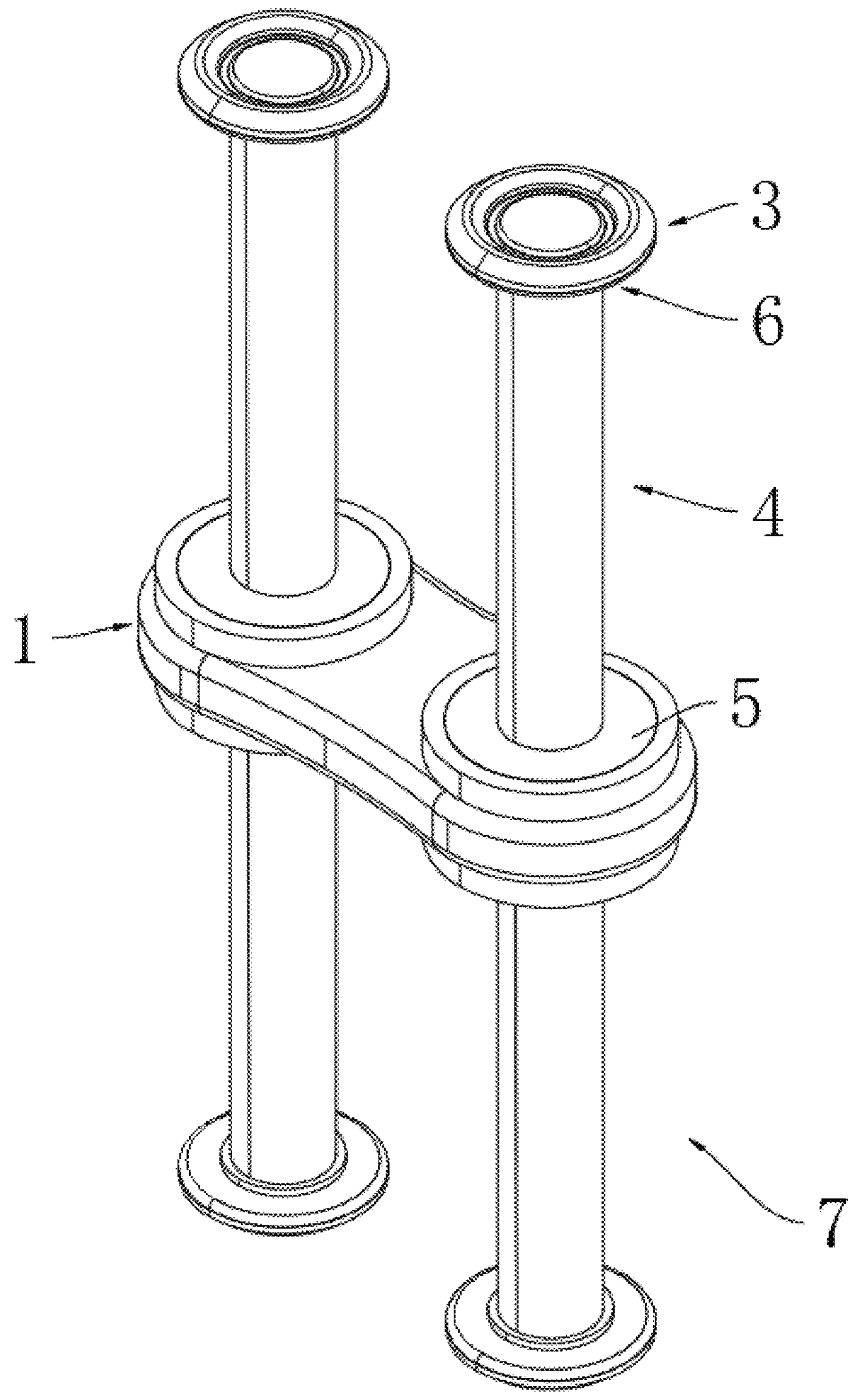
FIG. 4 is a structure diagram of a holding frame in the present application.
Figure 5:
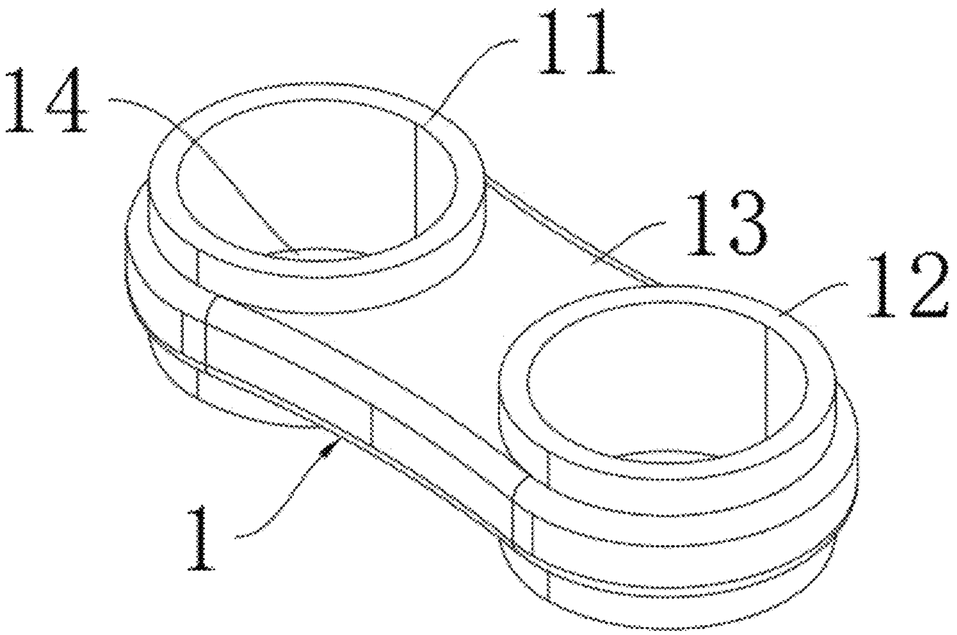
FIG. 5 is a structure diagram of a holder in FIG. 4.

As shown in FIG. 1 and FIG. 4, a handheld roller, including a holding frame 7, where four drums 2 rotate on a side wall of the holding frame 7, the holding frame 7 provides a carrier for the rotation of the four drums 2, to enable users' fingers to squeeze the four drums 2 to rotate on the holding frame 7, thus maintaining the rotating stability of the four drums 2.

Figure 2:
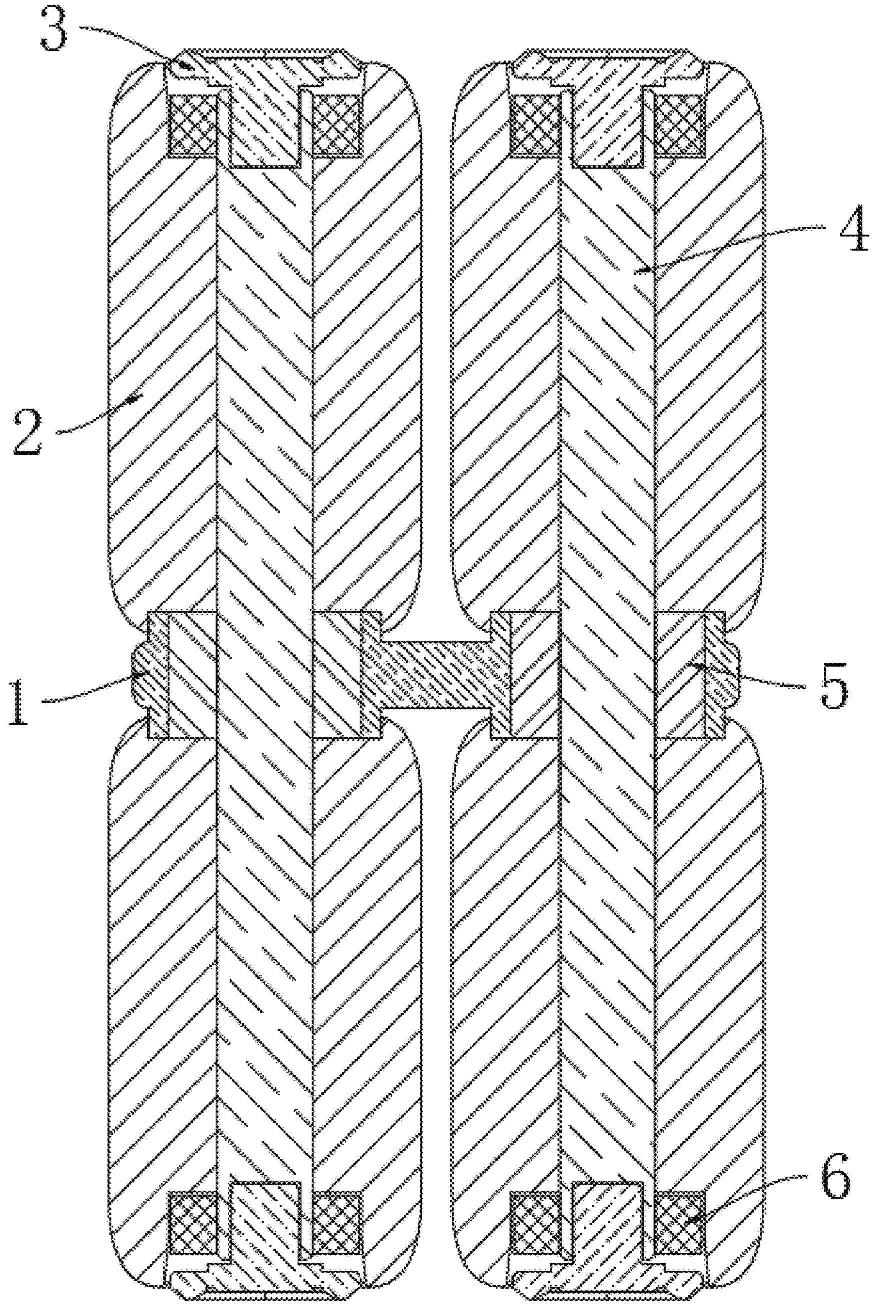
FIG. 2 is a profile structure diagram of a handheld roller in FIG. 1.
Figure 3:
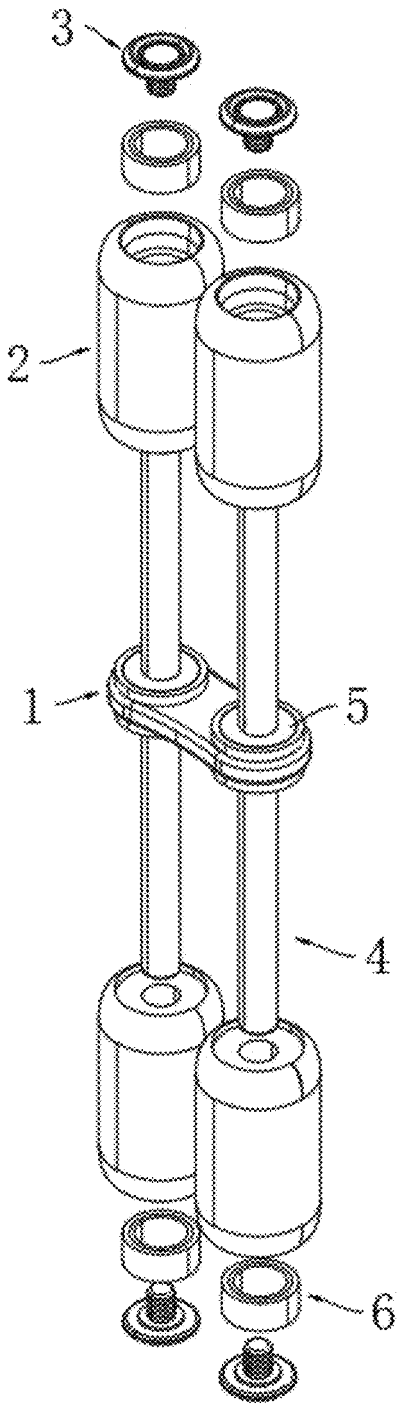
FIG. 3 is an explosion structure diagram of a handheld roller in FIG. 1.
Figure 6:
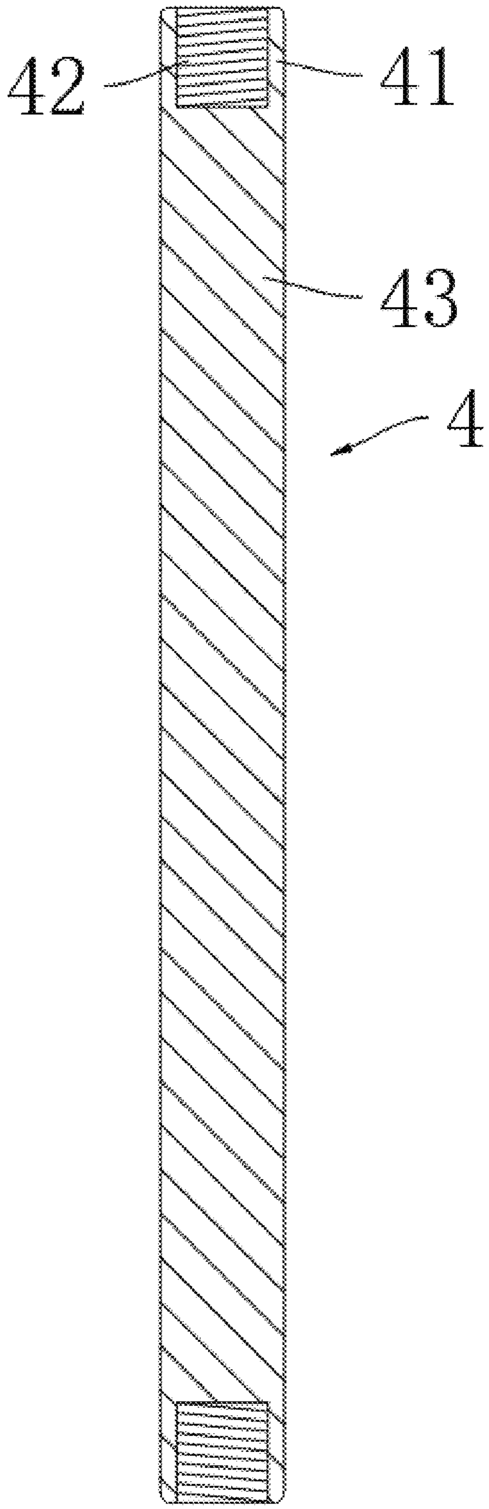
FIG. 6 is a structure diagram of an axis body in FIG. 4.

As shown in FIGS. 2 to 4, the holding frame 7 includes two axis bodies 4 and a holder 1 for a rotating connection of the axis bodies 4, where side walls of the two axis bodies 4 are rotationally connected with interiors of two drums 2, and a carrier for installing the drums 2 is provided through the axis bodies 4, such that the four drums 2 can rotate on side walls of the axis bodies independently;

The axis bodies 4 and the drums 2 have the specific structures as follows:

As shown in FIG. 6, both the axis bodies 4 include axis levers 43 and fixed columns 41 arranged on both ends of the axis levers 43, end faces of the fixed columns 41 are provided with fixed holes 42, and side walls of the axis levers 43 are rotationally connected with the interiors of the drums 2, where the axis levers 43 and the fixed columns 41 are integrally formed.

Figure 7:
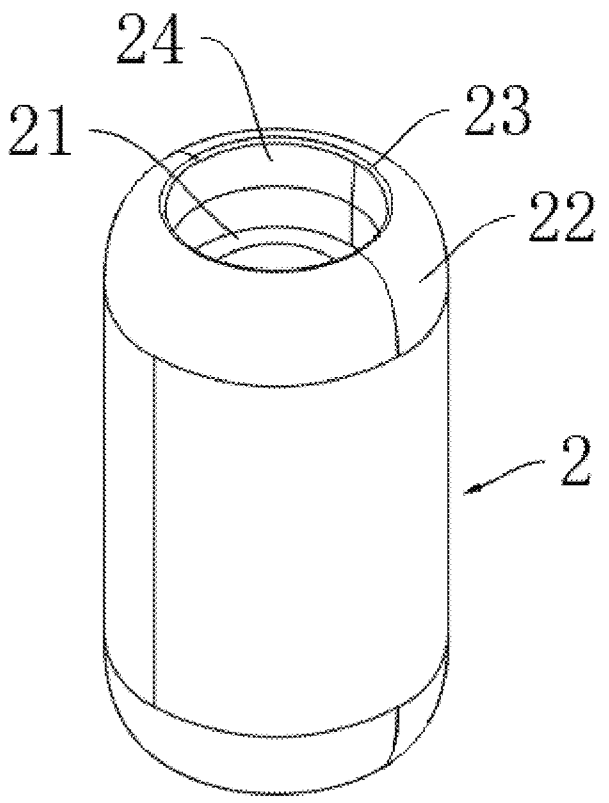
FIG. 7 is a structure diagram of a drum in FIG. 1.
Figure 8:
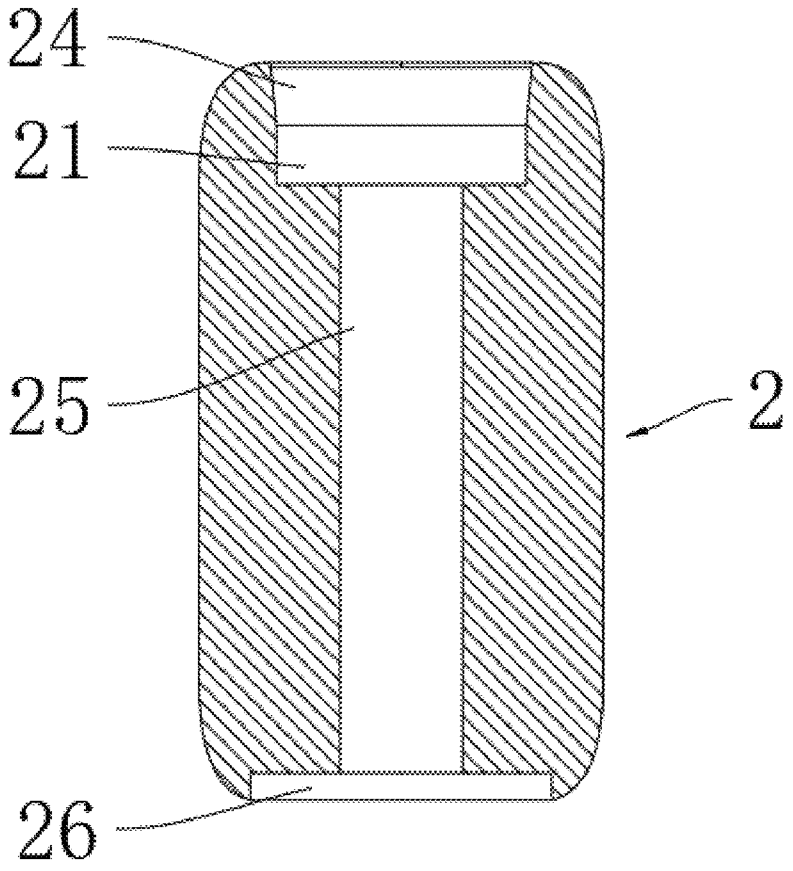
FIG. 8 is a section structure diagram of a drum in FIG. 7.

As shown in FIG. 7 and FIG. 8, axis holes 25 are provided inside the four drums 2, two end faces of the drums 2 are provided with first built-in slots 24 and second built-in slots 26, bearing installation holes 21 are provided in the drums 2 located between the first built-in slots 24 and the axis holes 25, the first built-in slots 24, the bearing installation holes 21, the axis holes 25 and the second built-in slots 26 have axes located on a same axis, the fixed columns 41 are located in the bearing installation holes 21 and the first built-in slots 24, and the axis levers 43 are located in the axis holes 25;

where second bearings 6 are provided at gaps between peripheries of the fixed columns 41 and the bearing installation holes 21.

When any one of the drums 2 rotates on the corresponding axis bodies 4, the fixed columns 41 of the axis bodies 4 rotate in any direction in the bearing installation holes 21 through second bearings 6, and meanwhile the axis levers 43 can rotate in the axis holes 25 and the second built-in slots 26 in respective.

It is worth noting that diameters of the fixed columns 41 are less those that of the axis levers 43, and the stability when the drums 2 rotate on the side walls of the axis levers 43 is ensured by increasing the diameters of the axis levers 43.

To reduce the discomfort caused by sharp parts to human bodies during rotation of the drums 2, a transition surface 22 from a side wall of any one of the four drums 2 to the two end faces thereof is an arc surface, and a transition edge 23 from the two end faces of any one drum 2 to the each of the first built-in slots 24 and each of the second built-in slots 26 is an arc edge, to reduce the transition surface 22 from the side wall of each of the drum 2 to the two end faces thereof; and if the transition surface 22 is a sharp shape, a situation of a blocked rotation in fingers and palms is caused during rotation, and meanwhile the design that the transition edge 23 from the two end faces of the drums 2 to each of the first built-in slots 24 and each of the second built-in slots 26 is the arc edge can also prevent a situation of flesh cuts caused on the finger skin by the end faces.

Figure 9:
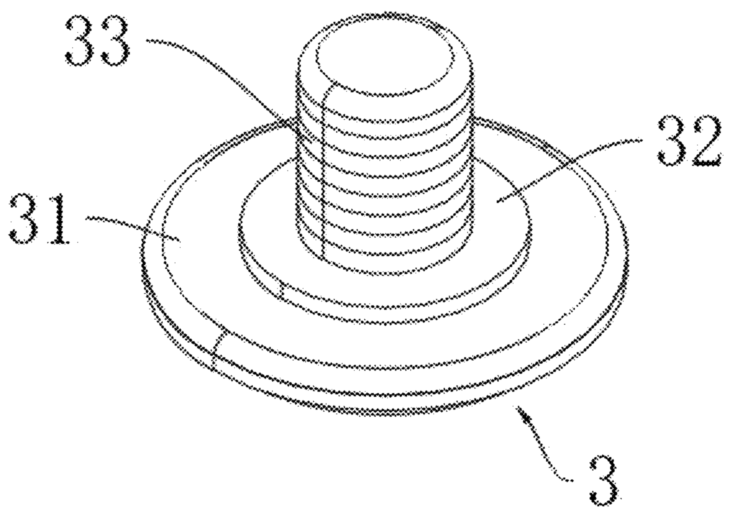
FIG. 9 is a structure diagram of a pin head in FIG. 3.

As shown in FIG. 3 and FIG. 9, to prevent the occurrence of disengagement or displacement situations after the four drums 2 are sleeved on the axis bodies 4, the fixed holes 42 are provided on the end faces of the fixed columns 41, the two axis bodies 4 are separately provided with pin heads 3 at the outer end parts of the drums 2, the pin heads 3 include pin columns 33, the pin columns 33 are mounted in the fixed holes 42 that are provided on the end faces of the fixed columns 41, end parts of the pin columns 33 are provided with bosses 32, end parts of the bosses 32 are provided with pin caps 31, inner diameters of the first built-in slots 24 are greater than diameters of the pin caps 31 of the pin heads 3, an edge of one face of each of the pin caps 31 that is close to each of the first built-in slots 24 presents an arc surface, the fixed columns 41 and the pin heads 3 may be mounted in a pin joint manner or a threaded manner, for example, the threaded manner is adopted for installation, the fixed holes 42 are threaded holes, side walls of the pin columns 33 are provided with threads, the pin columns 33 enable the pin caps 31 to be separately located on the outer end parts of the drums 2 in a manner that the threads screw into the threaded holes, to prevent the drums 2 falling from the axis bodies 4 or occurring a displacement, thus ensuring that the drums 2 are not easy to occur a longitudinal shake when rotating on the axis bodies 4.

The holder 1 has the specific structure as follows:

As shown in FIGS. 1 to 5, the holder 1 is a mounting carrier for the two axis bodies 4, the stable rotation of the drums 2 on the axis bodies 4 can be further ensured as long as the two axis bodies 4 can rotate on the holder 1 stably, thus enabling the handheld roller to be used stably; to ensure the stable rotation of the axis bodies 4 on the holder 1, a top face and a bottom face of the holder 1 are holder end faces 13, both sides of the top face and the bottom face of the holder 1 are separately provided with installation holes 14, the holder end faces 13 located at the positions of the installation holes 14 are separately provided with convex holes 11, hole diameters of the convex holes 11 are consistent with those of the installation holes 14, top faces of the convex holes 11 are convex hole end faces 12, the convex hole end faces 12 are higher than the holder end faces 13; and first bearings 5 are arranged inside the convex holes 11, the two axis bodies 4 are inserted into inner rings of the first bearings 5 in respective, and the two axis bodies 4 rotate in the convex holes 11 on both sides of the holder 1 through the first bearings 5, respectively;

The use of the thicker first bearings 5 is allowed in a premise that the rest part of the holder 1 is unchanged in thickness through a design that the convex holes 11 are thicker than the holder 1, thus further increasing the rotating stability;

specifically, the axis levers 43 are arranged inside the convex holes 11 in respective, and the thicker first bearings 5 are mounted in the concave holes 11 and the installation holes 14, such that the axis levers 43 of the axis bodies 4 are inserted and fixed to inner rings of the first bearings 5 in a manner of more contact area, inner diameters of the second built-in slots 26 are greater than outer diameters of the convex holes 11, the convex hole end faces 12 are arranged inside the second built-in slots 26, the increase of the second built-in slots 26 reserves space for the convex holes 11 in a premise of ensuring to increase the holder 1 for the concave holes 11 and unchanged thickness of the rest part of the holder 1, thus not causing a rotating friction among the drums 2 in a case of ensuring the drums 2 to add the convex holes 11.

A circle of the side wall of the holder 1 and edges of the holder end faces 13 are set as fillet structures, side walls of both sides of the holder 1 are indented arc surfaces facing inwards, and both end parts of the holder 1 are oblate structures, such that the holder 1 is in contact with the user's fingers and palms in a rounded surface, and the side walls of both sides of the holder 1 are in a design of the indented arc surfaces facing inwards, facilitating the user's holding of the handheld roller with the fingers.

Embodiment 2

On the basis of Embodiment 1, assembling steps for a handheld roller are provided, specifically as follows:

S1, assembly of the axis bodies 4 and the drums 2: the fixed columns 41 of the axis bodies 4 are inserted into the drums 2 along a direction from the second built-in slots 26 to the axis holes 25 until the fixed columns 41 of the axis bodies 4 are inserted into the bearing installation holes 21;

S2, assembly of the second bearings 6, axis bodies 4 and drums 2: the second bearings 6 are assembled in the bearing installation holes 21, such that outer rings of the second bearings 6 are fixed to the bearing installation holes 21, and inner rings of the second bearings 6 are fixed to side walls of the fixed columns 41, such that the axis bodies 4 can rotate inside the drums 2 through the second bearings 6;

S3, installation of the pin heads 3: if the threaded way is adopted for installation, the fixed holes 42 in the fixed columns 41 are threaded holes, side walls of the pin columns 33 are set as threads, and then the pin heads 3 rotate to enter the threaded holes, that is, the assembly of the pin heads 3, axis bodies 4 and drums 2 is completed;

SS4, assembly of the holder 1: the first bearings 5 are separately embedded into the convex holes 11 and the installation holes 14 that are provided on the holder 1, and the thicker first bearings 5 are selected to ensure that the first bearings 5 do not leak out of the convex hole end faces 12 after the first bearings 5 are mounted; and S5, assembly of the axis bodies 4 and holder 1: the axis levers 43 of the various axis bodies 4 assembled in S3 are inserted and fixed to inner rings of the first bearings 5 in the concave holes 11 in respective, that is, the assembly for the handheld roller in the present application is completed.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

The invention claimed is:

1. A handheld roller, comprising a holding frame (7), wherein four drums (2) rotate on the holding frame (7), the holding frame (7) comprises two axis bodies (4) and a holder (1) for a rotating connection of the axis bodies (4), and side walls of each of the two axis bodies (4) are rotationally connected with interiors of two of the drums (2);

wherein the holder (1) comprises a top face and an opposite bottom face, and two installation portions, each of the installation portions comprises a top protrusion portion protruding from the top face, a bottom protrusion portion protruding from the bottom face, and a through hole (11, 14) formed through from the top protrusion portion to the bottom protrusion portion, wherein each of the top protrusion portions and bottom protrusion portions is mounted in one of the drums (2); and wherein two first bearings (5) are respectively arranged inside the through holes (11, 14), the two axis bodies (4) are respectively inserted into inner rings of the first bearings (5), and the two axis bodies (4) rotate in the through holes (11, 14) through the first bearings (5), respectively.

2. The handheld roller according to claim 1, wherein both the axis bodies (4) comprise axis levers (43) and fixed columns (41) arranged on both ends of the axis levers (43), end faces of the fixed columns (41) are provided with fixed holes (42), and side walls of the axis levers (43) are rotationally connected with the interiors of the drums (2).

3. The handheld roller according to claim 2, wherein the two axis bodies (4) are separately provided with pin heads (3) at outer end parts of the drums (2), the pin heads (3) comprise pin columns (33), the pin columns (33) are mounted in the fixed holes (42) that are provided on the end faces of the fixed columns (41), end parts of the pin columns (33) are provided with bosses (32), and end parts of the bosses (32) are provided with pin caps (31).

4. The handheld roller according to claim 3, wherein axis holes (25) are provided inside the four drums (2), two end faces of the four drums (2) are provided with first built-in slots (24) and second built-in slots (26), bearing installation holes (21) are provided in the drums (2) located between the first built-in slots (24) and the axis holes (25), and the first built-in slots (24), the bearing installation holes (21), the axis holes (25) and the second built-in slots (26) have axes located on a same axis.

5. The handheld roller according to claim 4, wherein the fixed columns (41) are located in the bearing installation holes (21) and the first built-in slots (24), the axis levers (43) are located in the axis holes (25), and side walls of the axis levers (43) are rotationally connected in the installation through holes (11, 14) through the first bearings (5), wherein second bearings (6) are provided at gaps between peripheries of the fixed columns (41) and the bearing installation holes (21).

6. The handheld roller according to claim 5, wherein inner diameters of the second built-in slots (26) are greater than outer diameters of the through holes (11, 14), and the top protrusion portions and bottom protrusion portions are arranged inside the second built-in slots.

7. The handheld roller according to claim 4, wherein inner diameters of the first built-in slots (24) are greater than diameters of the pin caps (31) of the pin heads (3), and an edge of one face of each of the pin caps (31) that is close to each of the first built-in slots (24) presents an arc surface.

8. The handheld roller according to claim 2, wherein diameters of the fixed columns (41) are less than those of the axis levers (43).

9. The handheld roller according to claim 1, wherein a transition surface (22) from a side wall of any one of the four drums (2) to the two end faces thereof is an arc surface, and a transition edge (23) from the two end faces of any one of the drums (2) to each of the first built-in slots (24) and each of the second built-in slots (26) is an arc edge.

10. The handheld roller according to claim 1, wherein a circle of the side wall of the holder (1) and edges of the top face and bottom face are filleting to be round, side walls of both sides of the holder (1) are indented arc surfaces facing inwards, and both end parts of the holder (1) are oblate structures.

11. The handheld roller according to claim 1, wherein the two installation portions are arranged at two ends of the holder (1).

12. A handheld roller, comprising a holding frame (7), wherein four drums (2) rotate on the holding frame (7), the holding frame (7) comprises two axis bodies (4) and a holder (1) for a rotating connection of the axis bodies (4), and side walls of each of the two axis bodies (4) are rotationally connected with interiors of two of the drums (2);

wherein the holder (1) comprises a top face and an opposite bottom face, and two installation portions, each of the installation portions comprises a top protrusion portion protruding from the top face, a bottom protrusion portion protruding from the bottom face, and a through hole (11, 14) formed through from the top protrusion portion to the bottom protrusion portion, wherein each of the top protrusion portions and bottom protrusion portions is mounted in one of the drums (2);

wherein two first bearings (5) each are arranged inside one of the through holes (11, 14), the two axis bodies (4) are respectively inserted into inner rings of the first bearings (5), and the two axis bodies (4) rotate in the through holes (11, 14) through the first bearings (5), respectively; and wherein each of drums (2) is provided a second bearing (6) and a pin head (3) at an end thereof away from the holder (1), the second bearing (6) is arranged between an inner wall of the end of the drum (2) and an end of the axis body (4), the pin head (3) covers the end of the drum (2) and is connected to the axis body (4).

* * * * *